(12) United States Patent
Muppirala et al.

(10) Patent No.: US 8,255,577 B2
(45) Date of Patent: Aug. 28, 2012

(54) I/O FORWARDING TECHNIQUE FOR MULTI-INTERRUPT CAPABLE DEVICES

(75) Inventors: Kishore Kumar Muppirala, Bangalore Karnataka (IN); Narayanan Ananthakrishnan Nellayi, Bangalore Karnataka (IN); Senthil Kumar Ramakrishnan, Cupertino, CA (US); Bhanu Gollapudi Venkata Prakash, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 157 days.

(21) Appl. No.: 12/109,577

(22) Filed: Apr. 25, 2008

(65) Prior Publication Data

US 2008/0294832 A1 Nov. 27, 2008

(30) Foreign Application Priority Data

Apr. 26, 2007 (IN) .............................. 893/CHE/2007

(51) Int. Cl.
*G06F 3/00* (2006.01)
(52) U.S. Cl. ............................ 710/5; 710/260; 710/268
(58) Field of Classification Search .................. 710/5, 7; 718/105
See application file for complete search history.

(56) References Cited

U.S. PATENT DOCUMENTS

| | | | | |
|---|---|---|---|---|
| 6,237,058 B1 * | 5/2001 | Nakagawa | ..................... | 710/260 |
| 6,606,676 B1 * | 8/2003 | Deshpande et al. | .......... | 710/262 |
| 6,711,643 B2 * | 3/2004 | Park et al. | ..................... | 710/260 |
| 6,952,743 B2 * | 10/2005 | Ortega et al. | ..................... | 710/5 |
| 7,610,425 B2 * | 10/2009 | Solomita et al. | .............. | 710/260 |
| 7,650,483 B2 * | 1/2010 | Charra et al. | ..................... | 712/11 |
| 2002/0073257 A1 * | 6/2002 | Beukema et al. | ............. | 710/105 |
| 2003/0217115 A1 * | 11/2003 | Rowlands | ..................... | 709/214 |
| 2004/0019723 A1 * | 1/2004 | Ostrovsky et al. | ........... | 710/260 |
| 2005/0060460 A1 * | 3/2005 | Karamatas et al. | ........... | 710/260 |
| 2006/0212607 A1 * | 9/2006 | Riethmuller | ..................... | 710/6 |
| 2009/0094611 A1 * | 4/2009 | Danne et al. | .................. | 718/105 |

OTHER PUBLICATIONS

Hewlett-Packard Development Company, L.P.; Distributed Interrupts and I/O Forwarding; http://docs.hp.comien/5965-4406/ch05s11.html; 1997.
Hewlett-Packard Development Company, L.P.; ccNUMA overview; 5981-7419EN; Sep. 2003.
PCI-SIG; PCI Local Bus Specification 3.0, section 6,8; Feb. 3, 2004; Copyright 1992, 1993, 1995, 1998, and 2004.

* cited by examiner

*Primary Examiner* — Elias Mamo

(57) ABSTRACT

The method, apparatus and system of an I/O forwarding technique for multi-interrupt capable I/O devices are disclosed. In one embodiment, a method of transferring an I/O request in a cache-coherent non-uniform memory access (ccNUMA) computer system including multiple cells (e.g., each cell may include multiple processors) that are connected via a system interconnect, includes receiving an I/O request from one of the multiple processors associated with one of the multiple cells in the ccNUMA computer system, associating a processor, corresponding to a multi-interrupt capable I/O interface that is servicing the I/O request, located in the one of the multiple cells as a lead processor, and executing an I/O initiation path and a completion path associated with the received I/O request on the lead processor upon associating the lead processor corresponding to the multi-interrupt capable I/O interface.

25 Claims, 5 Drawing Sheets

I/O FORWARDING TECHNIQUE FOR MULTI-INTERRUPT CAPABLE DEVICES

RELATED APPLICATIONS

This patent application claims priority to Indian patent application serial no. 893/CHE/2007, having title "AN I/O FORWARDING TECHNIQUE FOR MULTI-INTERRUPT CAPABLE DEVICES", filed on 26 Apr. 2007 in India, commonly assigned herewith, and hereby incorporated by reference.

BACKGROUND

The processing associated with an Input/Output (I/O) operation in an operating system (OS) in a computer system may logically be divided into two parts. A first part may include preparation and dispatch of a device level I/O request to a hardware I/O device in response to a read or write request from an application. A second part may include receiving and processing a response from the hardware I/O device and returning a completion indication to the application. The first part may be termed "request processing", while the second part may be termed "response processing".

The processing time in an OS usually depends on a number of OS internal layers the IO request has to pass through. The OS internal layers are referred to as I/O stack layers. For example, a typical I/O request may traverse through several internal layers of an OS during both request processing and response processing. Various data structures may be accessed at each layer. In addition, as the I/O request flows through the I/O stack layers, each layer maintains book keeping of data structures, referred to as "metadata", for tracking the I/O request. Once the I/O request is serviced by the I/O devices, these I/O stack layers perform the completion processing and clean-up/update state of the I/O request in their metadata, before notifying the requesting process about the completion of the I/O request.

Generally, while processing the I/O request, the I/O stack layers do not reach the actual data buffer, but focus significantly on processing the metadata maintained by each layer for tracking the I/O request. For example, when a process makes an I/O request on a first processor, the associated I/O stack layers process the request on that processor and issue the request to an associated device adapter from that processor. However, the device adapter may be configured to interrupt a second processor on completing the I/O request, which can result in the I/O stack layers accessing their metadata from the second processor. As the I/O request originated from the first processor, the second processor may generate a fair amount of "cache-coherency traffic" on a central bus to bring the metadata from the cache associated with the first processor to the second processor. This can not only result in requiring more processor cycles for both the request processing and response processing, but also can affect the overall system performance due to additional traffic created on the central bus.

To avoid such additional cache-coherency traffic, the interrupt process may be bound to a processor where the I/O request originated. However, this can create significant load imbalance on the system by binding many processes to a specific processor to which the device adapter's interrupts are bound. Further, the interrupt process needs to be migrated to another processor when it starts performing I/O to a device whose interrupts are bound to that processor, which can result in additional overheads associated with the process movements across the processors.

Current techniques use I/O forwarding to minimize such cache-coherency overhead. The I/O requests for a device are forwarded to the processor that is configured to be interrupted by the device when the I/O completes. The I/O forwarding is generally performed at a device driver level in the I/O stack layers, as the device adapter through which the I/O request would be issued is likely to be known at this I/O stack layer. This ensures the I/O request initiation and completion code paths in the device driver and interface driver components of the I/O stack are executed on the same processor. Further, the I/O forwarding ensures that the metadata of these I/O stack layers are accessed from the same processor to which the interrupt is bound. Even though the I/O forwarding improves metadata locality on the I/O stack layers by forwarding the I/O request to a processor to which the interrupt is bound, it does not exploit recent developments in server such as, cell locality in non-uniform memory access (NUMA) architecture and I/O technologies including multi-interrupt capable device adapters that are capable of interrupting multiple processors.

BRIEF DESCRIPTION OF THE DRAWINGS

Example embodiments are illustrated by way of example and not limitation in the figures of the accompanying drawings, in which like references indicate similar elements and in which.

Figure 1:
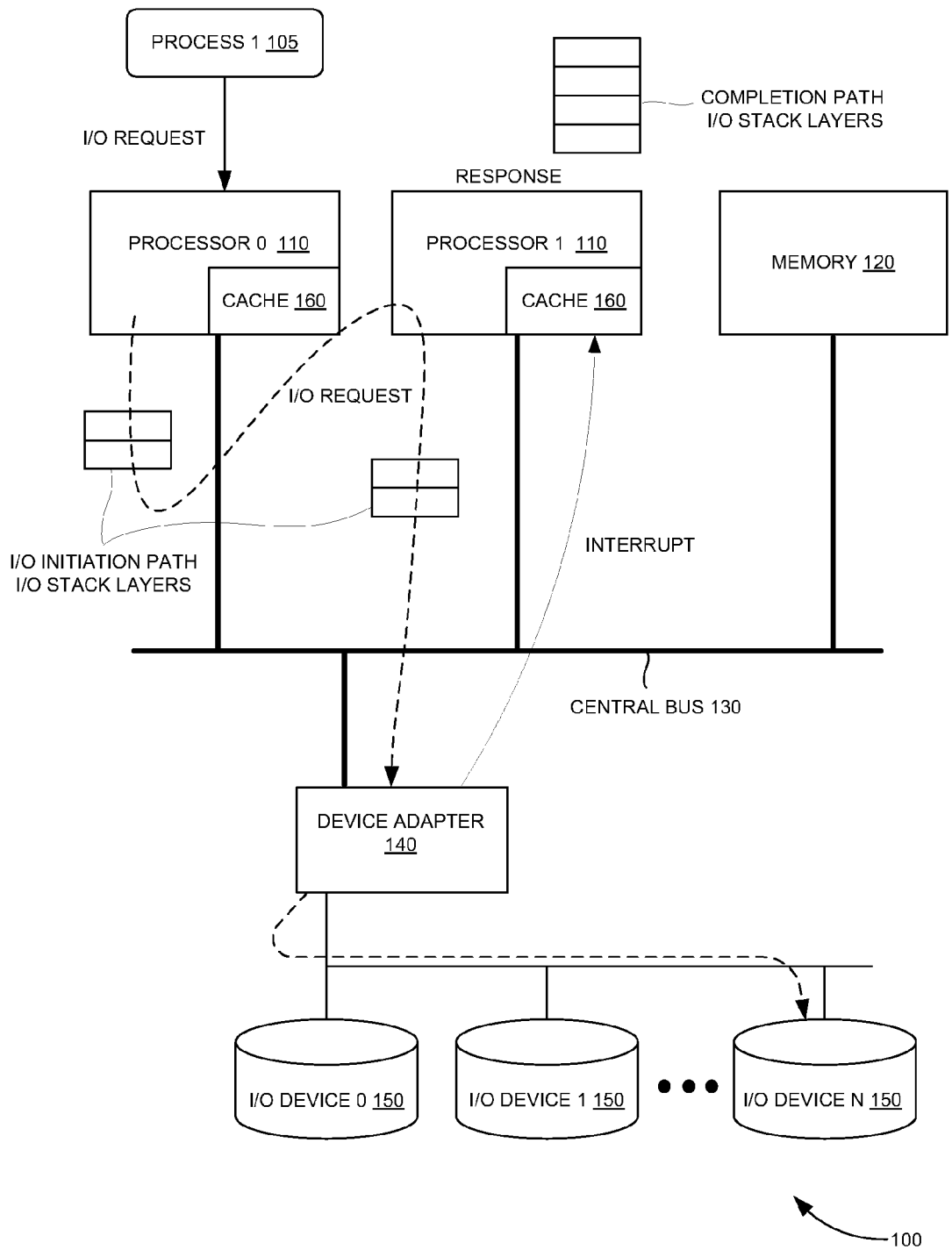
FIG. 1 is a block diagram illustrating a high level functionality of an I/O request and completion processing using an I/O forwarding technique.

Other features of the present embodiments will be apparent from the accompanying drawings and from the detailed description that follows.

DETAILED DESCRIPTION

A method, an apparatus, and a system for an I/O forwarding technique for multi-interrupt capable devices are disclosed. In the following description, for purposes of explanation, numerous specific details are set forth in order to provide a thorough understanding of the various embodiments. It will be evident, however, to one skilled in the art that the various embodiments may be practiced without these specific details.

In one embodiment, a method of transferring an I/O request in a cache coherent non-uniform memory access (ccNUMA) computer system including multiple cells (e.g., each cell may include multiple processors) that are connected via a system interconnect (e.g., the system interconnect 260 of FIG. 2) includes receiving an I/O request from one of the multiple processors (e.g., the processor 1-N 220 of FIG. 2) associated with one of the multiple cells (e.g., the cells 210 of FIG. 2) in the ccNUMA computer system, associating a processor, corresponding to a multi-interrupt capable I/O interface (e.g., the multi-interrupt capable I/O interface 1 270 of FIG. 2) that is servicing the I/O request, located in the one of the multiple cells as a lead processor (e.g., the lead processor 1 225 of FIG. 2), and executing an I/O initiation path and a completion path associated with the received I/O request on the lead processor upon associating the lead processor corresponding to the multi-interrupt capable I/O interface.

In another embodiment, an article includes a storage medium having instructions. The instructions when executed by a computing platform result in execution of a method of transferring an I/O request in a ccNUMA computer system including multiple cells (e.g., each cell may include multiple processors) that are connected via a system interconnect. The storage medium having instructions to receive an I/O request from one of the multiple processors (e.g., the processor 1-N 220 of FIG. 2) associated with one of the multiple cells in the ccNUMA computer system, associate a lead processor corresponding to a multi-interrupt capable I/O interface that is servicing the I/O request in one of the multiple cells, and execute an I/O initiation path and a completion path on the lead processor (e.g., the lead processor 1 225 of FIG. 2) located within the one of the multiple cells (e.g., the cells 1-N 210 of FIG. 2) upon associating the lead processor with the multi-interrupt capable I/O interface.

In yet another embodiment, a system includes a ccNUMA computer system including multiple cells (e.g., each cell may include multiple processors) connected via a system interconnect (e.g., the system interconnect 260 of FIG. 2), one or more multi-interrupt capable I/O interfaces (e.g., the multi-interrupt capable I/O interfaces 1-N 270 of FIG. 2) coupled to the ccNUMA computer system via the system interconnect, one or more I/O devices (e.g., the I/O devices 1-N 280 of FIG. 2) connected to associated one or more multi-interrupt capable I/O interfaces, a system memory (e.g., the system memory 240 of FIG. 2), and an I/O management software (e.g., the I/O management software 250 of FIG. 2) residing in the system memory configured to receive an I/O request from one of the multiple processors associated with one of the multiple cells in the ccNUMA computer system, associate a processor, corresponding to a multi-interrupt capable I/O interface that is servicing the I/O request, located in the one of the multiple cells as a lead processor, and execute an I/O initiation path and a completion path associated with the received I/O request on the lead processor upon associating the lead processor corresponding to the multi-interrupt capable I/O interface.

FIG. 1 is a block diagram 100 illustrating a high level functionality of an I/O request and completion processing using an I/O forwarding technique, according to one embodiment. Particularly, FIG. 1 illustrates a process 1 105, processors 0-1 110, a memory 120, a central bus 130, a device adapter 140, I/O devices 0-N 150 and cache 160, according to one embodiment.

The process 1 105 may issue an I/O request on the processor 0 110 in order to process and forward the I/O request to the processor 1 110. The processors 0 and 1 110 may interpret and execute the I/O request through I/O stack layers associated with the processors 0-1 110. The processor 1 110 may be configured to be interrupted by the device adapter 140. The memory 120 may retain data that correspond to processing of the I/O request. The central bus 130 may be a subsystem (e.g., a collection of wires) that transfers data (e.g., data in the form of information associated with the I/O request) between the processors 0 and 1 110 during the execution of the I/O initiation path and the completion path. The device adapter 140 may service the I/O request and/or may interrupt the processor 1 110 to which the I/O request from the processor 0 110 is forwarded. The device adapter 140 connected to the processor 1 110 through the central bus 130 may interrupt only the processor 1 110 in a multi-processor computer system.

The I/O devices 0-N 150 may be storage devices coupled to the device adapter 140 to receive a device-level I/O request from the processor 1 110 and respond to the received device-level I/O request via the device adapter 140. The cache 160 may be a temporary storage area located in the processors 0-1 110 consisting of information associated with the I/O stack layers.

In the example embodiment illustrated in FIG. 1, the processors 0-1 110 are coupled to the device adapter 140 through the central bus 130. In addition, the processors 0-1 110 are coupled to the memory 120 through the central bus 130. The device adapter 140 connects the I/O devices 0-N 150.

According to the example embodiment illustrated in FIG. 1, the process 1 105 issues the I/O request to the processor 0 110 in which the execution of certain I/O stack layers in the I/O initiation path occurs. The processor 0 110 forwards the I/O request to the processor 1 110, that is configured to be interrupted by an associated device when the I/O task is completed, using the I/O forwarding technique to execute the remaining I/O stack layers in the I/O initiation path and all the I/O stack layers in the completion path. Such I/O forwarding is generally performed at the device driver level in the I/O stack layers, as the device adapter 140 through which the I/O request would be processed is likely to be known at the I/O stack layers.

During the execution of the I/O stack layers in the I/O initiation path in the processor 1 110, the device-level I/O request is sent from processor 1 110 to the I/O devices 0-N 150 via the device adapter 140. Further, the processor 1 110 receives a response to the device-level request from the I/O devices 0-N 150. The processor 1 110 executes all the I/O stack layers in the completion path, as the device interrupts are bound to the processor 1 10. Additionally, the device adapter 140 may interrupt the processor 1 110 for processing of the I/O request(s) placed in a designated device queue upon the completion of the processing of the I/O request(s). The above technique ensures that the I/O request initiation path and completion path I/O stack layers in the device driver and the interface driver components of the I/O stack layers are executed on the same processor, i.e., the meta-data associated with these I/O stack layers is accessed on the same processor to which the device adapter interrupt is bound to improve meta-data locality of the I/O stack layers.

For example, FIG. 1 illustrates the I/O forwarding technique on the multi-processor computer system, designed around the I/O device's capability to interrupt only one processor (e.g., the processor 1 110 of FIG. 1). As shown in FIG. 1, the I/O request originating in processor 0 110 gets forwarded to processor 1 110 to which the device interrupts are bound and where the remaining I/O stack layers in the initiation path and completion path are processed. The I/O forwarding technique as illustrated in FIG. 1 may minimize cache coherency overhead using the meta-data locality of the I/O stack layers but may not take advantage of a device that is capable of interrupting the multiple processors. Also, the I/O forwarding technique used in the multi-processor computer system illustrated in FIG. 1 may not be exploiting performance benefits of 'cell locality' in a ccNUMA computer system.

Figure 2:
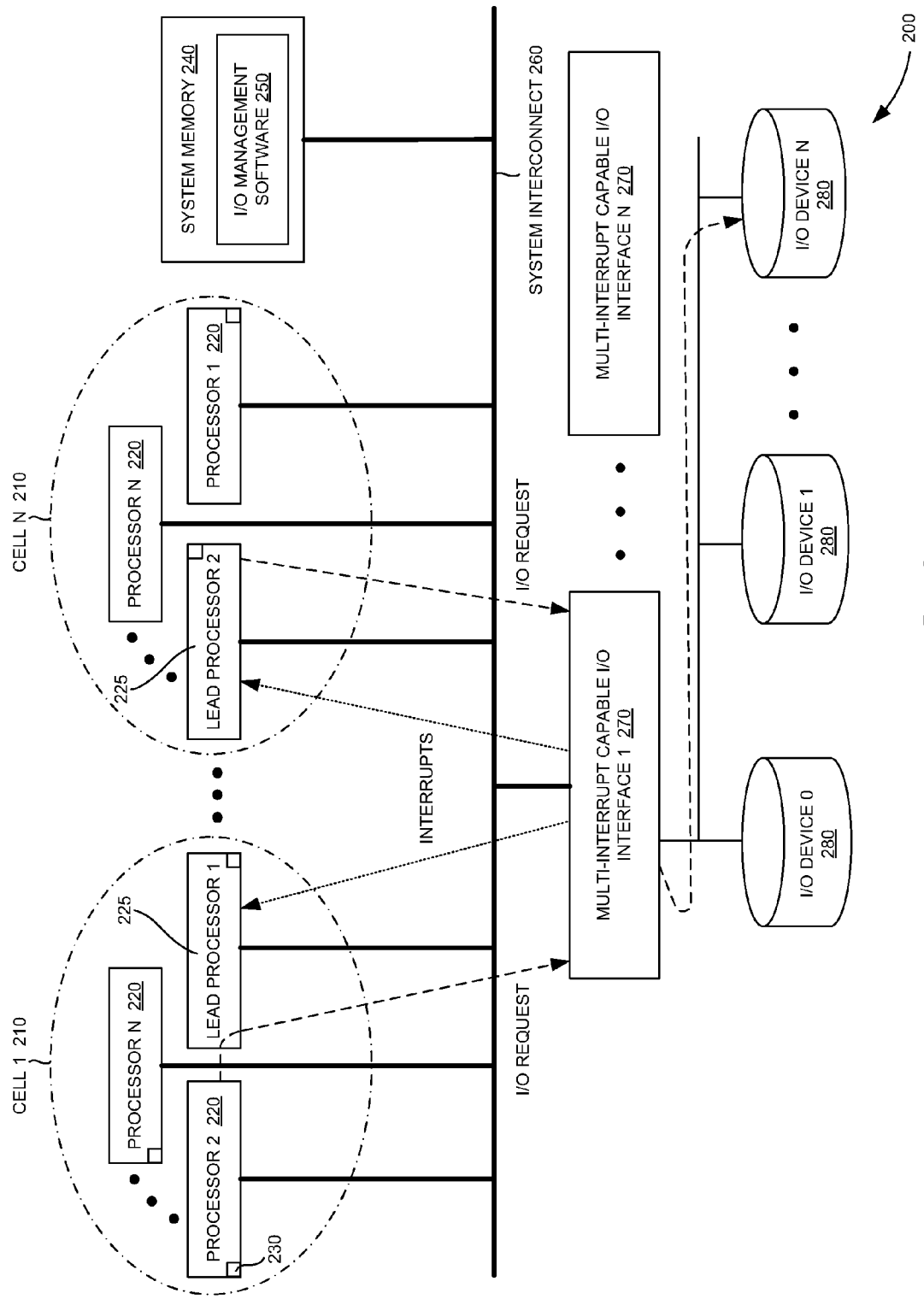
FIG. 2 is a block diagram illustrating a high level functionality of the I/O request and completion processing on a cache coherent non-uniform memory access (ccNUMA) computer system, according to one embodiment.

FIG. 2 is a block diagram 200 illustrating a high level functionality of an I/O request and completion processing on a ccNUMA computer system, according to one embodiment. Particularly FIG. 2 illustrates cells 1-N 210, processors 1-N 220, lead processors 1-2 225, a cache 230, a system memory 240, an I/O management software 250, a system interconnect 260, multi-interrupt capable I/O interfaces 1-N 270, and I/O devices 0-N 280, according to one embodiment.

The cells 1-N 210 may be electrical grouping of multiple processors (e.g., the processors 1-N 220, the lead processors 1-2 225 of FIG. 2) connected through the system interconnect 260 (e.g., a single bus, a hierarchy of buses, a crossbar, etc.). The processors 1-N 220 may be located in one of the multiple cells 1-N 210 and may execute processing of the I/O requests in the ccNUMA computer system. The lead processors 1 and 2 225 may be processors located in the associated cells 1 and N 210 which receive and handle interrupts from the multi-interrupt capable I/O interface 1 270. One of the processors in a cell (e.g., the cell 1 210 of FIG. 2) may be designated as a lead processor (e.g., the lead processor 1-2 225 of FIG. 2) such that the lead processor assignments to multiple interrupt capable devices are performed so that the I/O load is distributed across the multiple processors in a cell. This facilitates in employing the I/O forwarding within a cell. Basically, the lead processors within a cell facilitate in receiving and handling interrupts from the multi-interrupt capable interfaces 1-N 270.

The cache 230 may be a non-shared memory located in the multiple processors (e.g., the processor 1 220 and the lead processor 1 225 of FIG. 2) in which data structures (e.g., the data structures may be accessed by the lead processors 1-2 225 of FIG. 2 during completion of processing of response) containing information associated with I/O stack layers are stored. The system memory 240 may retain a data that correspond to processing of the I/O request in the ccNUMA computer system.

The I/O management software 250 may be a set of programming instructions residing in the system memory 240. The I/O management software 250 may be configured to transfer the I/O requests to the processor(s) (e.g., the lead processor 1 225 of FIG. 2) of the multiple cells 1-N 210 in the ccNUMA computer system using the I/O forwarding technique. The system interconnect 260 may be a single bus, a hierarchy of busses, or a cross bar interconnect that enables transferring of data (e.g., information associated with I/O request) among the multiple processors (e.g., the multiple processors 1-N 220 and the lead processors 1-2 225 of FIG. 2) of the multiple cells 1-N 210 in the ccNUMA computer system, the system memory 240 and the multi-interrupt capable I/O interfaces 1-N 270.

The multi-interrupt capable I/O interfaces 1-N 270 may post interrupts to the lead processors 1 and 2 225 and/or support multiple request/response queue pairs. Each queue pair may be programmed to interrupt different lead processors (e.g., the lead processor 1 225, the lead processor 2 225, etc. of FIG. 2), thus allowing distribution of the I/O request processing load across the multiple processors of the multiple cells 1-N 210 in the ccNUMA computer system. The request descriptor may be passed to the lead processors (e.g., the lead processor 1-2 225 of FIG. 2) in response to posting of interrupt by the multi-interrupt capable I/O devices 1-N 270. The I/O devices 0-N 280 may be connected to the multi-interrupt capable I/O interfaces 1-N 270 to receive a device-level I/O request from the lead processor(s) and to send a response to the device-level I/O request to the lead processor(s) via the multi-interrupt capable I/O interfaces 1-N 270.

In the example embodiment illustrated in FIG. 2, the multiple processors (e.g., the processors 1-N 220 and the lead processors 1-2 225 of FIG. 2) in the multiple cells 1-N 210 are coupled to the multi-interrupt capable I/O interfaces 1-N 270 through the system interconnect 260. The multiple processors in the multiple cells 1-N 210 are also connected to the system memory 240 through the system interconnect 260. The I/O devices 0-N 280 are connected to the multi-interrupt capable interfaces 1-N 270. The multi-interrupt capable I/O interfaces 1-N 270 may be a device capable of interrupting multiple processors in the multiple cells 1-N 210 which are referred to as lead processors (e.g., the lead processors 1 and 2 225 of FIG. 2). The multi-interrupt capable I/O interface 1-N 270 may interrupt the multiple processors to which interrupt vector is assigned.

In one example embodiment illustrated in FIG. 2, the processor 2 220 of the cell 1 210 receives the I/O request. As the I/O request is received by the processor 2 220, certain of the I/O stack layers in an I/O initiation path are processed in the processor 2 220. The remaining I/O stack layers in the I/O initiation path associated with the I/O request is then forwarded to the lead processor 1 225 of the cell 1 210 which is configured to receive and handle interrupts from multi-interrupt capable I/O device 1 270. In the lead processor 1 225, remaining I/O stack layers in the I/O initiation path may be executed. During the execution of the I/O initiation path, a device-level I/O request is sent to the I/O device N 280 from the lead processor 1 225 through the multi-interrupt capable I/O interface 1 270 for extracting relevant data. A response to the device-level I/O request is received at the lead processor 1 225 which then executes all the I/O stack layers in the completion path. Thus, taking advantage of "cell locality" available in the ccNUMA computer system using the I/O forwarding technique.

In another example embodiment illustrated in FIG. 2, the lead processor 2 225 of the cell N 210 receives the I/O request. As the I/O request is received in the lead processor 2 225, execution of all I/O stack layers in an I/O initiation path and a completion path takes place in the lead processor 2 225 of cell N 210. During the execution of I/O stack layers in the I/O initiation path in the lead processor 2 225, a device-level I/O request is sent to the I/O devices 1-N 280 from the lead processor 2 225 through the multi-interrupt capable I/O interface 1 270 for extracting relevant data.

The lead processor 2 225 executes all the I/O stack layers in the completion path upon receiving a response to the device-level I/O request from the I/O devices 1-N 280. Thus, the I/O forwarding technique used in the ccNUMA computer system takes advantage of "cache locality".

In some embodiment, the process may be pinned to current processor (e.g., the lead processor 1 225 of FIG. 2) of a particular cell, using soft affinity, on issuing the I/O request. The process may be pinned to the lead processor of a particular cell, so that the I/O request does not migrate off to the processors of another cell, while the I/O stack is processing its request. The I/O stack completes its processing of I/O request in the lead processor (e.g., the lead processor 1 225 of FIG. 2). Upon completion of processing of the I/O request, the process may be unpinned from its current processor.

For example, the I/O request may be received from one of the multiple processors 1-N 220 associated with one of the multiple cells 1-N 210 in the ccNUMA computer system. A processor (e.g., the lead processor 1 225 of FIG. 2) may be associated, corresponding to a multi-interrupt capable I/O interface (e.g., the multi-interrupt capable I/O interface 1 270 of FIG. 2) that is servicing the I/O request, located in the one of the multiple cells 1-N 210 as a lead processor. The I/O initiation path and the completion path associated with the received I/O request may be executed on the lead processor (e.g., the lead processor 1 225 of FIG. 2) upon associating the lead processor corresponding to the multi-interrupt capable I/O interface 1 270.

It may be determined whether one of the multiple processors 1-N 220 that received the I/O request is the lead processor (e.g., the lead processor 1 225 and/or the lead processor 2 225 of FIG. 2) in the one of the multiple cells 1-N 210. The I/O initiation path and the completion path may be executed in the one of the multiple processors (e.g., the lead processor 2 225 of FIG. 2), if the one of the multiple processors that received the I/O request is the lead processor (e.g., the lead processor 2 225 of FIG. 2). Further, the execution of the I/O initiation path may include preparing a request descriptor (e.g., the request descriptor may include an identification of the one of the multiple processors 1-N 220) at the one of the multiple processors (e.g., the lead processor 2 225 of FIG. 2), and sending a device-level I/O request to an I/O device N 280 from the one of the multiple processors (e.g., the lead processor 2 225 of FIG. 2) via the multi-interrupt capable I/O interface 1 270.

In addition, the execution of the I/O completion path may include receiving a response to the device-level I/O request from the I/O device via the multi-interrupt capable I/O interface 1 270 to one of the multiple processors (e.g., the lead processor 2 225 of FIG. 2) in another one of the multiple cells 1-N 210 and completing processing of the response at the lead processor 2 225 located in the one of the multiple cells (e.g., the cell 1 210 of FIG. 2).

In case, the one of the multiple processors (e.g., the processor 2 220 of FIG. 2) that received the I/O request is not the lead processor, control may be transferred to process remaining I/O stack layers in the I/O initiation path and all the I/O stack layers in the completion path from the one of the multiple processors (e.g., the processor 2 220 of FIG. 2) to the lead processor 1 225. The remaining I/O stack layers in the I/O initiation path and all the I/O stack layers in the completion path may be executed on the lead processor 1 225 located in the one of the multiple cells (e.g., the cell 1 210 of FIG. 2). Furthermore, the transferring of control to process the remaining I/O stack layers from the one of the multiple processors to the lead processor is through a soft interrupt. The term "soft interrupt" may refer to an asynchronous signal generated within the processor 2 220 by executing an instruction to transfer the control to process the I/O requests to the lead processor 1 225.

The execution of the remaining I/O stack layers in the I/O initiation path may include preparing a request descriptor (e.g., the request descriptor may include an identification of the one of the multiple processors) at the one of the multiple processors (e.g., the lead processor 1 225 of FIG. 2) in the one of the multiple cells (e.g., the cell 1 210 of FIG. 2), and sending a device-level I/O request to an I/O device N 280 from the one of the multiple processors (e.g., the lead processor 1 225 of FIG. 2) via the multi-interrupt capable I/O interface 1 270.

The execution of the I/O completion path of all I/O stack layers may include receiving a response to the device-level I/O request from the I/O device N 280 via the multi-interrupt capable I/O interface 1 270 at the lead processor 1 225, and completing the processing of the response at the lead processor 1 225 in the one of the multiple cells (e.g., the cell 1 210 of FIG. 2). The completion of the processing of the response may include accessing one or more data structures stored in the cache 230 associated with the lead processor 1 225 in the one of the multiple cells (e.g., the cell 1 210 of FIG. 2). A data structure (e.g., the data structure may contain information associated with one or more I/O stack layers) of the one or more data structures may be dynamically allocated prior to preparation of the request descriptor.

The request descriptor may be passed to a callback function at the lead processor (e.g., the lead processor 1 225 of FIG. 2) in the one of the multiple cells in response to the posting of the interrupt. The preparing the request descriptor at the one of the multiple processors 1-N 220 in the one of the multiple cells 1-N 210 may include placing the I/O request on a designated device queue associated with the multi-interrupt capable I/O device 1 270 such that the multiple interrupt capable I/O device 1 270 would interrupt one of the multiple processors (e.g., the lead processor 1 225 of FIG. 2) in one of the multiple cells (e.g., the cell 1 210 of FIG. 2) on completion of the I/O request. The "queue" may be a collection of the I/O requests processed one after other by the lead processors 1-2 225 in the one of the multiple cells 1-N 210 in response to posting(s) of interrupt.

For example, the system includes the ccNUMA computer system which includes the multiple cells 1-N 210 (e.g., each cell may include multiple processors) connected via the system interconnect 260. The system also includes the one or more multi-interrupt capable I/O interfaces 1-N 270 coupled to the ccNUMA computer system via the system interconnect 260. In addition, the system includes the one or more I/O devices 0-N 280 connected to associated one or more multi-interrupt capable I/O interfaces 1-N 270. Furthermore, the system includes the system memory 240 in which I/O management software 250 resides.

The I/O management software 250 may be configured to receive an I/O request from one of the multiple processors 1-N 220 associated with one of the multiple cells 1-N 210 in the ccNUMA computer system. Furthermore, the I/O management software 250 may be configured to associate a processor (e.g., the processor 1 220 of FIG. 2), corresponding to a multi-interrupt capable I/O interface (e.g., the multi-interrupt capable I/O interface 1 270 of FIG. 2) that is servicing the I/O request, located in the one of the multiple cells 1-N 210 as a lead processor. The I/O management software 250 may further be configured to execute an I/O initiation path and a completion path associated with the received I/O request on the lead processor upon associating the lead processor corresponding to the multi-interrupt capable I/O interface.

In addition, the I/O management software 250 may be configured to determine whether one of the multiple processors that received the I/O request is the lead processor (e.g., the lead processor 1 225, the lead processor 2 225 of FIG. 2) located in the one of the multiple cells 1-N 210 and execute the I/O initiation path and the completion path in the one of the multiple processors 1-N 220, if the one of the multiple processors 1-N 220 that received the I/O request is the lead processor (e.g., the lead processor 2 225 of FIG. 2) in the one of the multiple cells (e.g., the cell 1 210 of FIG. 2). The I/O management software 250 may also be configured to prepare the request descriptor (e.g., the request descriptor may include an identification of the one of the multiple processors 1-N 220) at the lead processor 2 225, and send a device-level I/O request to the I/O device N 280 from the lead processor 2 225 via the multi-interrupt capable I/O interface 1 270.

The I/O management software 250 may be configured to receive a response to the device-level I/O request from the I/O devices 1-N 280 via one of the one or more multi-interrupt capable I/O interfaces 1-N 270 to one of the multiple processors 1-N 220 in another one of the multiple cells 1-N 210, and to complete processing of the response at the one of the multiple processors 1-N 220 located in the one of the multiple cells 1-N 210. Moreover, the I/O management software 250 may be configured to transfer control to process remaining I/O stack layers in the I/O initiation path and all the I/O stack layers in the completion path from the one of the multiple processors (e.g., the processor 2 220 of FIG. 2) to the lead processor 1 225 if the one of the multiple processors that received the I/O request is not the lead processor (e.g., the lead processor 1 225 of FIG. 2) in the one of the multiple cells (e.g., the cell 1 210 of FIG. 2), and execute the remaining I/O stack layers in the I/O initiation path and all the I/O stack layers in the completion path on the lead processor 1 225 located in the one of the multiple cells (e.g., the cell 1 210 of FIG. 2).

In addition, the I/O management software 250 may be configured to prepare the request descriptor (e.g., the request descriptor may include an identification of the one of the multiple processors 1-N 220) at the lead processor 1 225 in the one of the multiple cells 1-N 210, and send the device-level I/O request to the I/O device N 280 from the lead processor 1 225 via the multi-interrupt capable I/O interface 1 270.

The implementation of the I/O forwarding technique in the ccNUMA computer system in the presence of multi-interrupt capable I/O devices (e.g., the multi-interrupt capable I/O devices 1-N 270 of FIG. 2) enables distribution of I/O load across the processor groups (e.g., the cells 1-N 210 of FIG. 2) while reducing the cache coherency traffic.

Figure 3:
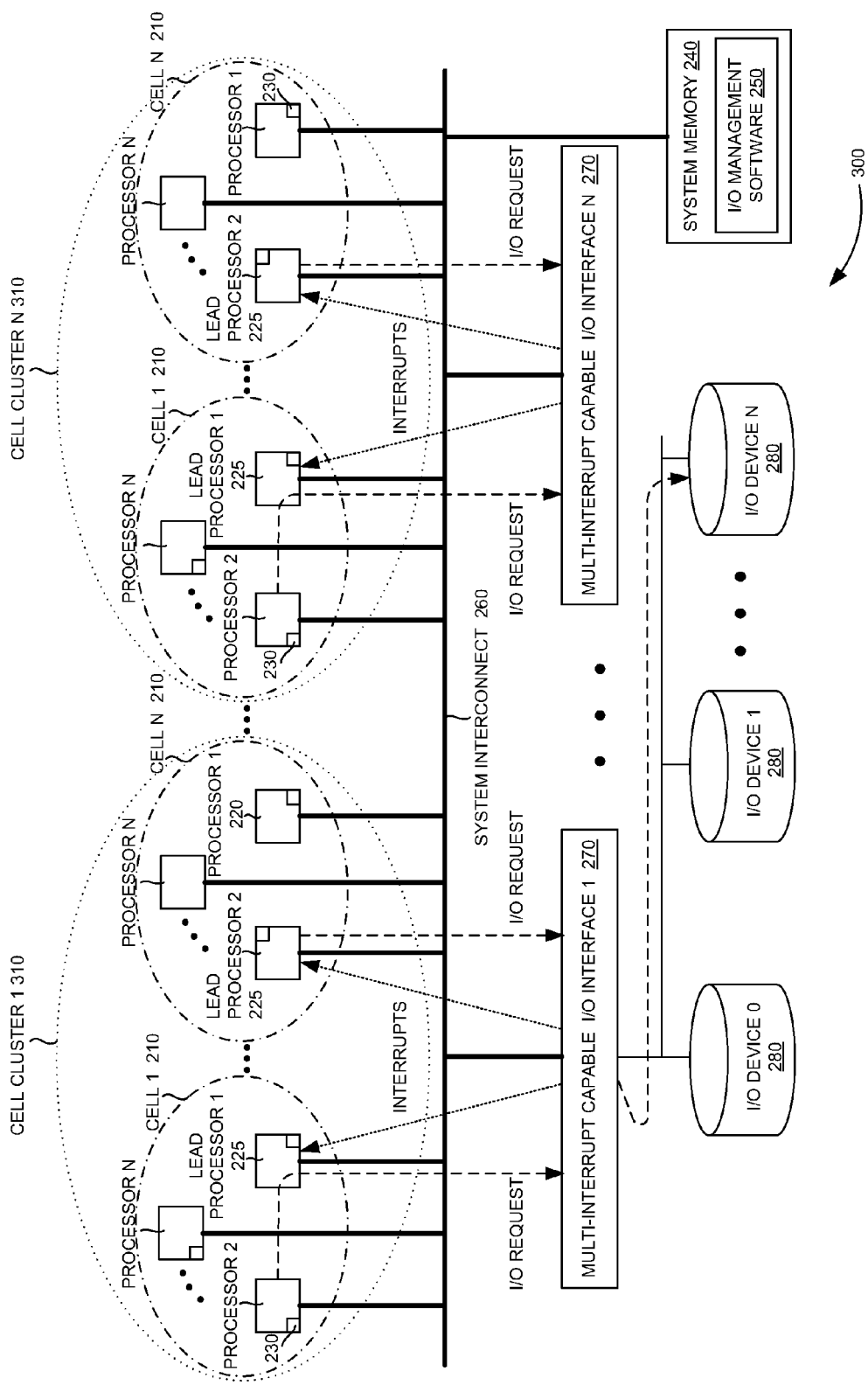
FIG. 3 is a block diagram illustrating a high level functionality of the I/O request and completion processing on the ccNUMA computer system, according to another embodiment.

FIG. 3 is a block diagram illustrating a high level functionality of the I/O request and completion processing on the ccNUMA computer system, according to another embodiment. Particularly, FIG. 3 illustrates the cells 1-N 210, the processors 1-N 220, the lead processors 1-2 225, the cache 230, the system memory 240, the I/O management software 250, the system interconnect 260, the multi-interrupt capable I/O interfaces 1-N 270, the I/O devices 0-N 280 and cell clusters 1-N 310, according to one embodiment.

As shown in FIG. 3, the cell clusters 1-N 310 are formed by grouping the multiple cells 1-N 210 in the ccNUMA computer system when the number of cells 1-N 210 in the ccNUMA computer system exceeds the number of interrupt vectors supported by the multi-interrupt capable I/O interface (e.g., the multi-interrupt capable I/O interface 1 270 of FIG. 2). The grouping of cells 1-N 210 to form the cell clusters 1-N 310 enables better I/O load balancing in the ccNUMA computer system.

In the example embodiment illustrated in FIG. 3, the processors (e.g., the processors 1-N 220 and the lead processors 1-2 225 of FIG. 2) in the multiple cells 1-2 210 grouped to form the cell clusters 1-N 3 10 are connected to the multi-interrupt capable I/O interfaces 1-N 270 and the system memory 240 through the system interconnect 260.

The cell cluster 1 310 embeds the cell 1 210 and cell 2 210 containing the lead processors 1 and 2 225 which are configured to be interrupted by the multi-interrupt capable I/O interface 1 270. Similarly, the cell cluster N 310 as illustrated in the example embodiment of FIG. 3, groups the cell 1 210 and the cell 2 210 consisting of lead processors 1 and 2 225 that are configured to be interrupted by the multi-interrupt capable I/O interface N 270.

Figure 4:
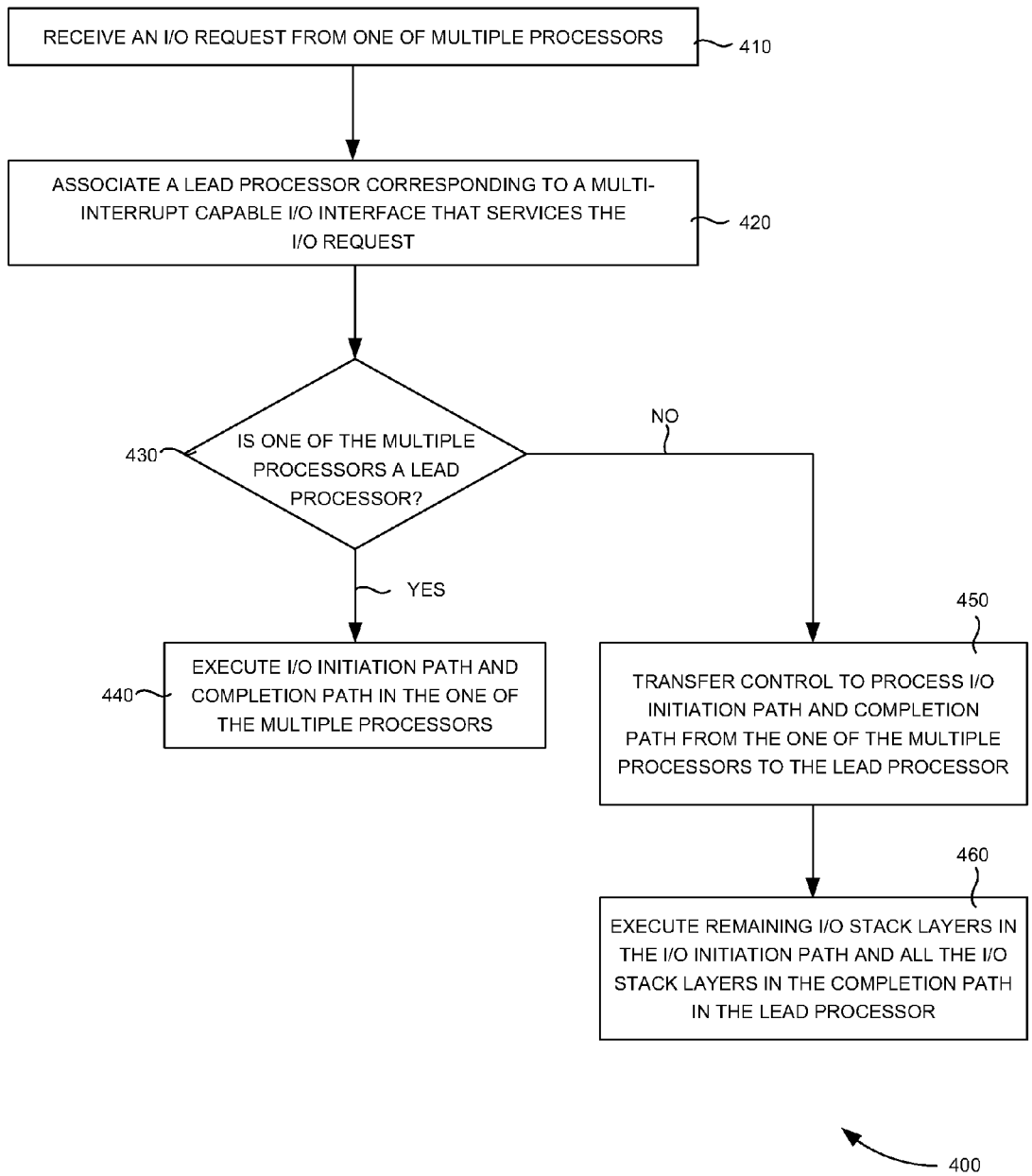
FIG. 4 is a process flow of the I/O forwarding technique based on a cell locality, according to one embodiment.

FIG. 4 is a process flow of the I/O forwarding technique based on a cell locality, according to one embodiment. In operation 410, an I/O request is received from one of the multiple processors associated with one of the multiple cells (e.g., the cells 1-N 210 of FIG. 2) in the ccNUMA computer system. At step 420, a lead processor (e.g., the lead processor 1 225 of FIG. 2) is associated corresponding to a multi-interrupt capable I/O interface (e.g., the multi-interrupt capable I/O interface 1 270 of FIG. 2) that services the I/O request.

At step 430, it is determined whether one of the multiple processors that received the I/O request is the lead processor (e.g., the lead processor 2 225 of FIG. 2) in the one of the multiple cells. At step 440, I/O initiation path and completion path is then executed in the one of the multiple processors if the I/O request is received at the lead processor. At step 450, if the I/O request is not received at the lead processor, control is transferred to process remaining I/O stack layers in the I/O initiation path and all I/O stack layers in the completion path from the one of the multiple processors (e.g., the processor 2 220 of FIG. 2) to the lead processor (e.g., the lead processor 1 225 of FIG. 2). At step 460, the remaining I/O stack layers in the I/O initiation path and all the I/O stack layers in I/O completion path are executed in the lead processor (e.g., the lead processor 1 225 of FIG. 2).

For example, the execution of the I/O initiation path may include preparing the request descriptor (e.g., the request descriptor may include an identification of the one of the multiple processors 1-N 220) at the one of the multiple processors in the one of the multiple cells and sending the device-level I/O request to the I/O device (e.g., the device N 280 of FIG. 2) from the one of the multiple processors via the multi-interrupt capable I/O interface (e.g., the multi-interrupt capable I/O device 1 270 of FIG. 2).

In addition, the execution of the I/O completion path in the lead processor may include receiving the response to the device-level I/O request from the I/O device via the multi-interrupt capable I/O interface at the lead processor and completing the processing of the response at the lead processor in the one of the multiple cells.

Figure 5:
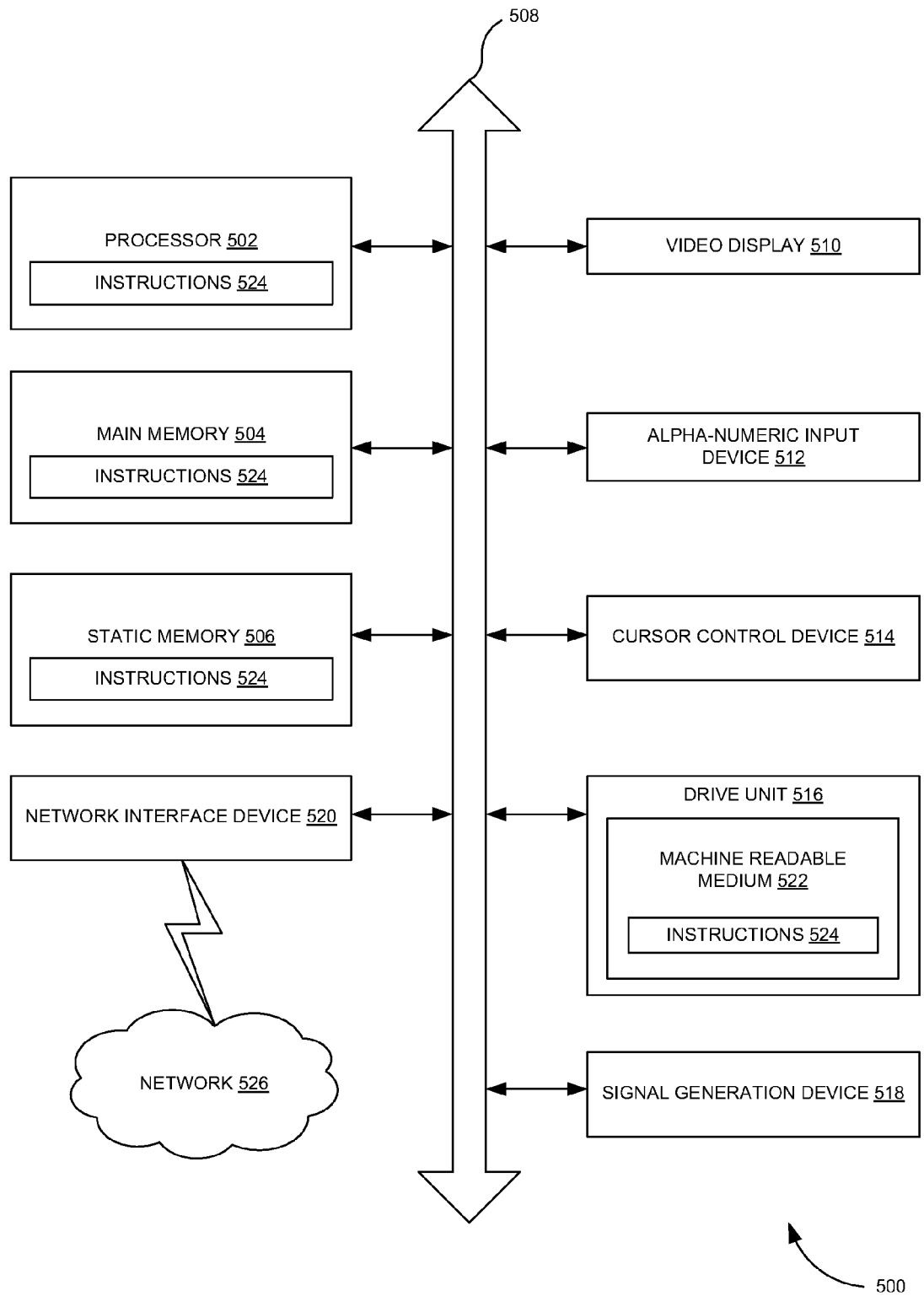
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. (e.g., Intel® Pentium® processor). The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one/or more operations disclosed herein.

For example, a storage medium having instructions, that when executed by a computing platform executes a method of transferring I/O request in the ccNUMA computer system including multiple cells (e.g., each cell may include multiple processors) that are connected via the system interconnect (e.g., the system interconnect 260 of FIG. 2), includes receiving an I/O request from one of the multiple processors 1-N 220 associated with one of the multiple cells 1-N 210 in the ccNUMA computer system, associating a processor, corresponding to the multi-interrupt capable I/O interface (e.g., the multi-interrupt capable I/O interfaces 1-N 270 of FIG. 2) that is servicing the I/O request, located in the one of the multiple cells as a lead processor, and executing the I/O initiation path and the completion path associated with the received I/O request on the lead processor (e.g., the lead processors 1-2 225 of FIG. 2) upon associating the lead processor (e.g., the lead processor 1 225 of FIG. 2) corresponding to the multi-interrupt capable I/O interface (e.g., the multi-interrupt capable I/O interface 1 270 of FIG. 2).

The storage medium may have instructions to determine whether one of the multiple processors that received the I/O request is the lead processor (e.g., the lead processors 1-2 225 of FIG. 2) in the one of the multiple cells 1-N 210. The storage medium may have instructions to execute the I/O initiation path and the completion path in the one of the multiple processors (e.g., the lead processor 2 225 of FIG. 2) if the one of the multiple processors that received the I/O request is the lead processor (e.g., the lead processor 2 225 of FIG. 2) in the one of the multiple cells (e.g., the cell N 210 of FIG. 2).

The storage medium may have instructions to prepare the request descriptor at the one of the multiprocessor that includes an identification of the one of the multiple processors and to send the device-level I/O request to the I/O device (e.g., the I/O device N 280 of FIG. 2) from the one of the multiple processors via the multi-interrupt capable I/O interface (e.g., the multi-interrupt capable I/O interface 1 270 of FIG. 2). The storage medium may have instructions to receive the response to the device-level I/O request from the multi-interrupt capable I/O interface to the one of the multiple processors in another one of the multiple cells, and complete processing of the response at the one of the multiple processors (e.g., the lead processor 2 225 of FIG. 2) located in the one of the multiple cells (e.g., the cell N 210 of FIG. 2).

Also, the storage medium may have instructions to transfer control to process remaining I/O stack layers in the I/O initiation path and all the I/O stack layers in the completion path from the one of the multiple processors (e.g., the processor 2 220 of FIG. 2) to the lead processor (e.g., the lead processor 1 225 of FIG. 2) upon determining the lead processor if the one of multiprocessors (e.g., the processor 2 220 of FIG. 2) that received the I/O request is not the lead processor in the one of the multiple cells (e.g., the cell 1 210 of FIG. 2). In addition, the storage medium may have instructions to execute the remaining I/O stack layers in the I/O initiation path and all the I/O stack layers in the completion path on the lead processor (e.g., the lead processor 1 225 of FIG. 2) located in the one of the multiple cells.

Furthermore, a computer system includes a processing unit and a memory coupled to the processor. The memory has code stored therein for creating memory page classification. The code causes the processor to receive an I/O request from one of the multiple processors associated with one of the multiple cells in the ccNUMA computer system, associate a processor, corresponding to a multi-interrupt capable I/O interface (e.g., the multi-interrupt capable device 1 270 of FIG. 2) that is servicing the I/O request, located in the one of the multiple cells as a lead processor, and execute the I/O initiation path and the completion path associated with the received I/O request on the lead processor (e.g., the lead processor 2 225 of FIG. 2) upon associating the lead processor corresponding to the multi-interrupt capable I/O interface (e.g., the multi-interrupt capable I/O device 1 270 of FIG. 2).

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of transferring an input/output (I/O) request in a cache-coherent non-uniform memory access (ccNUMA) computer system, wherein the ccNUMA computer system includes multiple cells that are connected via a system interconnect, and wherein each cell includes multiple processors, comprising:
   receiving an I/O request from a source processor, which is one of the multiple processors associated with one of the multiple cells in the ccNUMA computer system;
   associating a processor, which is different from the source processor, corresponding to a multi-interrupt capable I/O interface that is servicing the I/O request, located in the one of the multiple cells as a lead processor;
   executing an I/O initiation path associated with the received I/O request on the lead processor using soft affinity; and
   executing a completion path associated with the received I/O request on the lead processor using soft affinity.

2. The method of claim 1, further comprising:
   determining whether one of the multiple processors that received the I/O request is the lead processor in the one of the multiple cells; and
   if so, then executing the I/O initiation path and the completion in the one of the multiple processors.

3. The method of claim 2, wherein executing the I/O initiation path comprises:
   preparing a request descriptor at the one of the multiple processors, wherein the request descriptor includes an identification of the one of the multiple processors; and
   sending a device-level I/O request to an I/O device from the one of the multiple processors via the multi-interrupt capable I/O interface.

4. The method of claim 3, wherein executing the I/O completion path comprises:
   receiving a response to the device-level I/O request from the I/O device via the multi-interrupt capable I/O interface to one of the multiple processors in another one of the multiple cells; and
   completing processing of the response at the one of the multiple processors located in the one of the multiple cells.

5. The method of claim 2, further comprising:
   if not, transferring control to process remaining I/O stack layers in the I/O initiation path and all the I/O stack layers in the completion path from the one of the multiple processors to the lead processor upon determining the lead processor; and executing the remaining I/O stack layers in the I/O initiation path and all the I/O stack layers in the completion path on the lead processor located in the one of the multiple cells.

6. The method of claim 5, wherein transferring the control to process the remaining I/O stack layers from the one of the multiple processors to the lead processor is through a soft interrupt.

7. The method of claim 5, further comprising:
preparing a request descriptor at the one of the multiple processors in the one of the multiple cells, wherein the request descriptor includes an identification of the one of the multiple processors; and
sending a device-level I/O request to an I/O device from the one of the multiple processors via the multi-interrupt capable I/O interface.

8. The method of claim 7, wherein executing the I/O completion path comprises:
receiving a response to the device-level I/O request from the I/O device via the multi-interrupt capable I/O interface at the lead processor; and
completing processing of the response at the lead processor in the one of the multiple cells.

9. The method of claim 8, wherein completing the processing of the response comprises:
accessing one or more data structures stored in a cache associated with the lead processor in the one of the multiple cells.

10. The method of claim 9, wherein a data structure of the one or more data structures is dynamically allocated prior to preparation of the request descriptor.

11. The method of claim 10, wherein the data structure of the one or more data structures includes information associated with one or more I/O stack layers.

12. The method of claim 11, further comprising:
passing the request descriptor to a callback function at the lead processor in the one of the multiple cells in response to the posting of the interrupt.

13. The method of claim 9, wherein preparing the request descriptor at the one of the multiple processors in the one of the multiple cells comprises:
placing the I/O request on a designated device queue associated with a multi-interrupt capable I/O device such that the multiple interrupt capable I/O device would interrupt one of the multiple processors in one of the multiple cells on completion of the I/O request.

14. An article, comprising:
a storage medium having instructions, that when executed by a computing platform, result in execution of a method of transferring an input/output (I/O) request in a cache-coherent non-uniform memory access (ccNUMA) computer system, wherein the ccNUMA computer system includes multiple cells that are connected via a system interconnect and wherein each cell includes multiple processors, comprising:
receiving an I/O request from a source processor, which is one of the multiple processors associated with one of the multiple cells in the ccNUMA computer system;
associating a lead processor, which is different from the source processor and is located within the one of the multiple cells, corresponding to a multi-interrupt capable I/O interface that is servicing the I/O request in one of the multiple cells;
executing an I/O initiation path on the lead processor using soft affinity; and
executing a completion path on the lead processor using soft affinity.

15. The article of claim 14, further comprising:
determining whether one of the multiple processors that received the I/O request is the lead processor in the one of the multiple cells; and
if so, then executing the I/O initiation path and the completion path in the one of the multiple processors.

16. The article of claim 14, further comprising:
preparing a request descriptor at the one of the multiple processors, wherein the request descriptor includes an identification of the one of the multiple processors; and
sending a device-level I/O request to an I/O device from the one of the multiple processors via the multi-interrupt capable I/O interface.

17. The article of claim 16, wherein executing the I/O completion path comprises:
receiving a response to the device-level I/O request from the I/O device via the multi-interrupt capable I/O interface to one of the multiple processors in another one of the multiple cells; and
completing processing of the response at the one of the multiple processors located in the one of the multiple cells.

18. The article of claim 15, further comprising:
if not, transferring control to process remaining I/O stack layers in the I/O initiation path and all the I/O stack layers in the completion path from the one of the multiple processors to the lead processor upon determining the lead processor; and
executing the remaining I/O stack layers in the I/O initiation path and all the I/O stack layers in the completion path on the lead processor located in the one of the multiple cells.

19. A system comprising:
a cache-coherent non-uniform memory access (ccNUMA) computer system including multiple cells connected via a system interconnect, wherein each cell includes multiple processors;
one or more multi-interrupt capable input/output (I/O) interfaces coupled to the ccNUMA computer system via the system interconnect;
one or more I/O devices connected to associated one or more multi-interrupt capable I/O interfaces;
a system memory; and
an I/O management software residing in the system memory, wherein the I/O management software is configured to:
receive an I/O request from a source processor, which is one of the multiple processors associated with one of the multiple cells in the ccNUMA computer system;
associate a processor, which is different from the source processor, corresponding to a multi-interrupt capable I/O interface that is servicing the I/O request, located in the one of the multiple cells as a lead processor;
execute an I/O initiation path associated with the received I/O request on the lead processor using soft affinity; and
execute a completion path associated with the received I/O request on the lead processor using soft affinity.

20. The system of claim 19, wherein the I/O management software is further configured to determine whether one of the multiple processors that received the I/O request is the lead processor located in the one of the multiple cells and execute the I/O initiation path and the completion path in the one of the multiple processors.

21. The system of claim 20, wherein the I/O management software is further configured to prepare a request descriptor at the one of the multiple processors, wherein the request descriptor includes an identification of the one of the multiple processors if the one of the multiple processors that received the I/O request is the lead processor in the one of the multiple cells, and send a device-level I/O request to an I/O device from the one of the multiple processors via the multi-interrupt capable I/O interface.

22. The system of claim 21, wherein the I/O management software is further configured to receive a response to the device-level I/O request from the one or more I/O devices via one of the one or more multi-interrupt capable I/O interfaces to one of the multiple processors in another one of the multiple cells, and complete processing of the response at the one of the multiple processors located in the one of the multiple cells.

23. The method of claim 1, wherein the lead processor receives and handles interrupts from the multi-interrupt capable I/O interface.

24. The article of claim 14, wherein the lead processor receives and handles interrupts from the multi-interrupt capable I/O interface.

25. The system of claim 19, wherein the lead processor receives and handles interrupts from the multi-interrupt capable I/O interface.

* * * * *

UNITED STATES PATENT AND TRADEMARK OFFICE
CERTIFICATE OF CORRECTION

PATENT NO. : 8,255,577 B2
APPLICATION NO. : 12/109577
DATED : August 28, 2012
INVENTOR(S) : Kishore Kumar Muppirala et al.

It is certified that error appears in the above-identified patent and that said Letters Patent is hereby corrected as shown below:

In the Claims:

In column 12, line 47, in Claim 2, before "in" insert -- path --.

Signed and Sealed this
Twenty-first Day of May, 2013

Teresa Stanek Rea
*Acting Director of the United States Patent and Trademark Office*